United States Patent [19]

Stephens et al.

[11] Patent Number: 4,513,845
[45] Date of Patent: Apr. 30, 1985

[54] SUSPENSION SYSTEM FOR A TILT CAB TRUCK

[75] Inventors: Robert Stephens, Brookfield; Raymond Clark, Pewaukee, both of Wis.

[73] Assignee: Applied Power Inc., Milwaukee, Wis.

[21] Appl. No.: 444,207

[22] Filed: Nov. 24, 1982

[51] Int. Cl.³ .................... F16F 9/06; B60G 17/00
[52] U.S. Cl. ..................... 188/299; 180/89.15; 267/64.12; 267/64.24
[58] Field of Search ............. 188/297, 299, 300, 311, 188/313–318, 322.11, DIG. 1, DIG. 2; 180/89.14, 89.15; 60/591, 569, 583; 267/64.12, 267/64.1, 64.24

[56] References Cited

U.S. PATENT DOCUMENTS

| 3,086,622 | 4/1963 | Schultze | 188/300 |
| 3,472,547 | 10/1969 | London | 180/89.14 |
| 3,797,883 | 3/1974 | Steiner et al. | 180/89.14 |
| 3,831,999 | 8/1974 | Sonneborn | 180/89.14 |
| 4,166,612 | 9/1979 | Freitag et al. | 188/300 |
| 4,271,869 | 6/1981 | Weidl et al. | 188/314 |

Primary Examiner—Douglas C. Butler
Assistant Examiner—Alvin Oberley
Attorney, Agent, or Firm—John J. Byrne; Bradford E. Kile; Kevin M. O'Brien

[57] ABSTRACT

Disclosed is a suspension system for a tilt cab truck in which the shock absorber assemblies adjacent the tilt axis are collapsed to their minimum stroke prior to the initiation of the tilt cycle and held there by hydraulic lock throughout the tilt cycle.

5 Claims, 6 Drawing Figures

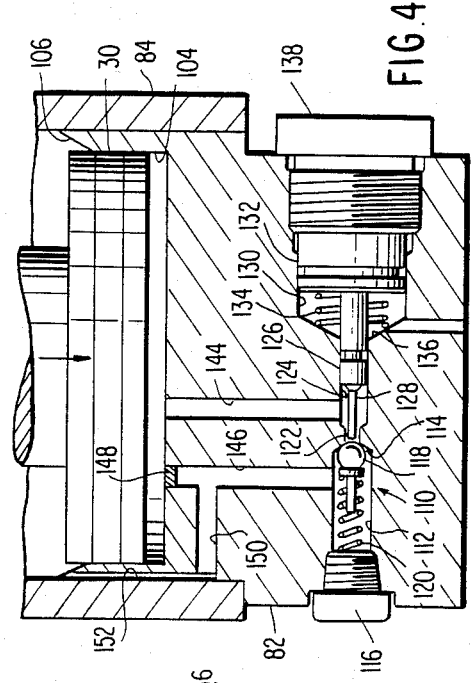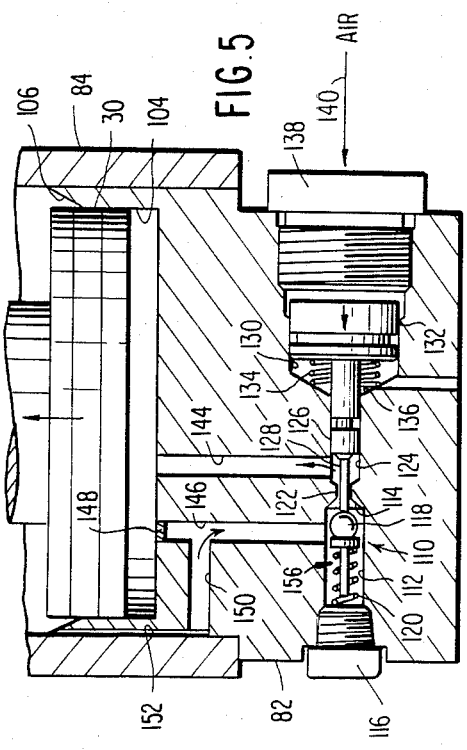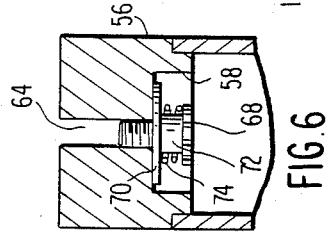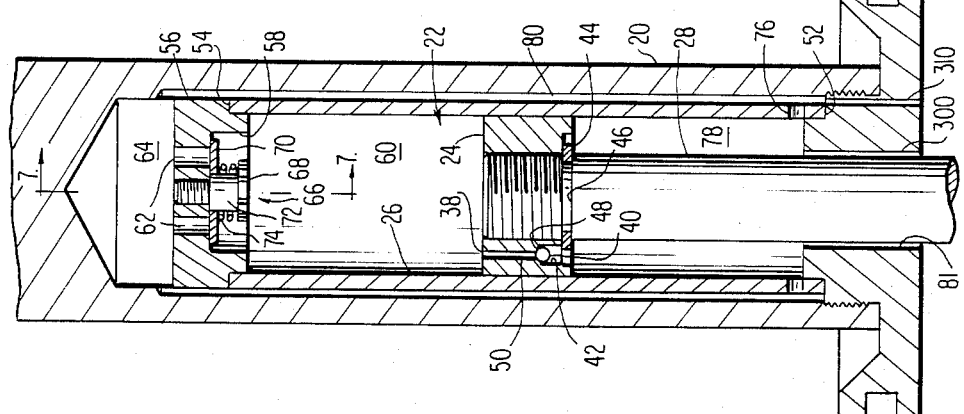

SUSPENSION SYSTEM FOR A TILT CAB TRUCK

FIELD OF THE INVENTION

This invention relates to tilt-cab trucks. More specifically, it relates to means for protecting the shock absorbers, the spring assemblies, and other truck components adjacent the tilt axis during the tilt cycle.

BACKGROUND OF THE INVENTION

Tilt-cab truck cabs are in some cases attached to their chassis by shock absorber and spring assemblies which permit relative movement of the cab and the chassis as the truck moves over the road. When the cab is tilted relative to the chassis for maintenance or the like, the shock absorber and spring assemblies remote from the tilting axis are normally released from one or the other of those two components and are not involved in the tilting operation. However, the shock absorber and spring assemblies adjacent to the tilting axis normally remain "on line." Since the release of the other shock absorbers and spring assemblies and the pivoting of the cab places the entire weight of the cab on the shock absorber and spring assemblies adjacent to the tilting axis, there is a tendency for the assemblies to "fall through" their stroke. Such an uncontrolled fall can result in damage both to the cab and to components fixed to the chassis, such as the radiator.

SUMMARY OF THE INVENTION

The subject invention is a suspension system for a tilt cab truck in which the shock absorber assemblies adjacent the tilt axis are collapsed to their minimum strokes prior to the initiation of the tilt cycle and held there by hydraulic lock throughout the tilt cycle.

BRIEF DESCRIPTION OF THE DRAWINGS

FIG. 3 is an enlarged cross-sectional view of the shock absorber subassembly contained within the front mount subassembly 14.

FIG. 4 is an enlarged cross-sectional view of the interior of the valve block 82 and the bottom of the cylinder 84, generally along the lines 4—4 in FIGS. 1 and 2, but showing the piston 30 moving downwardly just prior to reaching the end of its travel.

FIG. 5 is an enlarged cross-sectional view similar to FIG. 4 but showing the piston 30 moving upwardly just after beginning its upward stroke.

FIG. 6 is a cross-sectional view along the line 7—7 in FIG. 3.

DETAILED DESCRIPTION OF THE PRESENTLY PREFERRED EMBODIMENT

Figure 1:
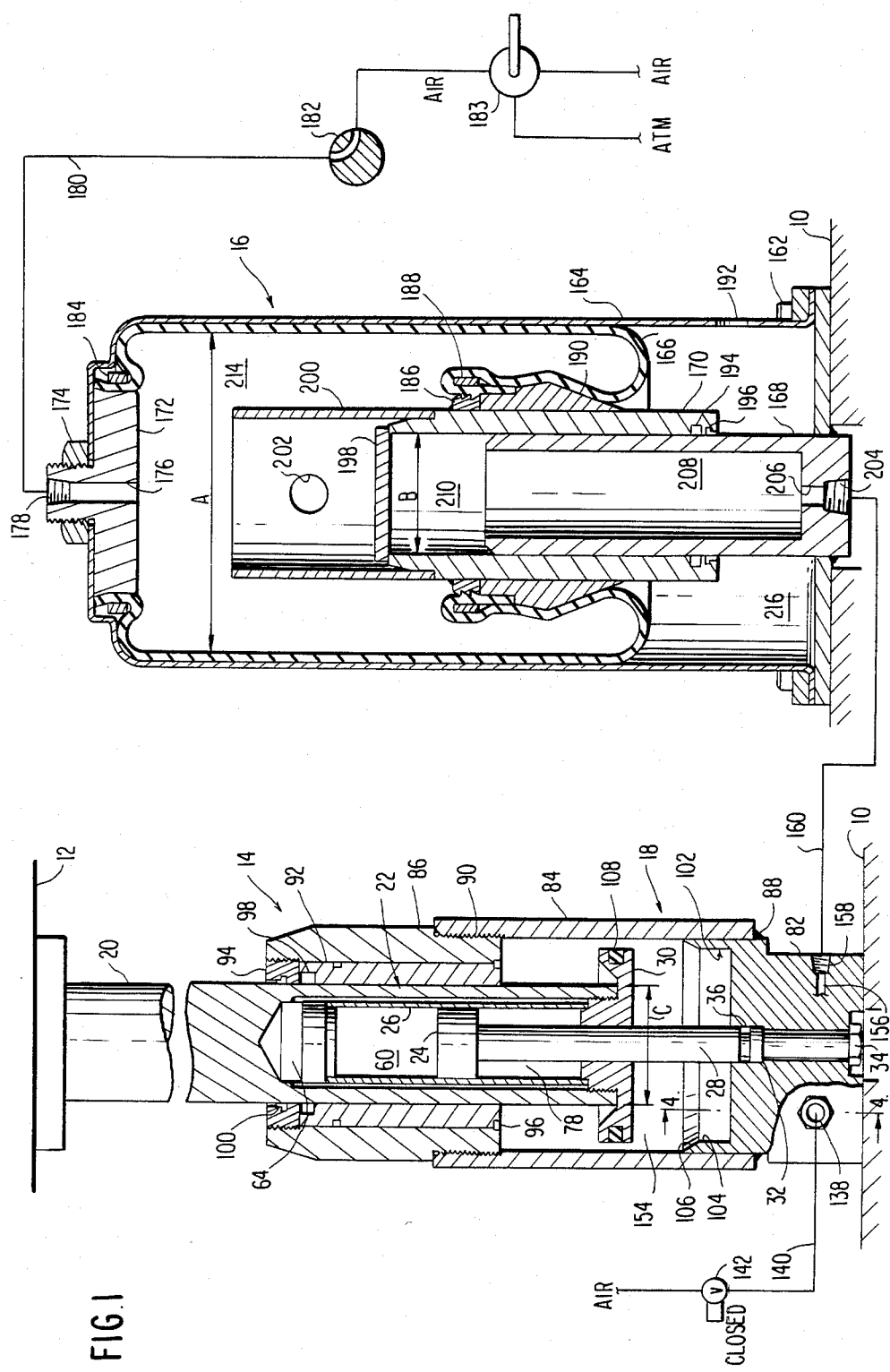
FIG. 1 is a partially schematic cross-sectional view of a front cab mount subassembly 14 and a pressure intensifier subassembly 16 in the normal, or over-the-road, position.

The subject invention was developed for use in tilt cab trucks, and it is accordingly illustrated and described in that environment. Thus, the numeral 10 indicates a portion of the chassis of a tilt cab truck, and the numeral 12 indicates a portion of the cab of the truck. The subject suspension system is conveniently made as three subassemblies, two front cab mount subassemblies 14 which are mounted between the chassis 10 and the cab 12 and a pressure intensifier subassembly 16 which is mounted on the chassis 10. Since the two front cab mount subassemblies 14 may be identical, only one is illustrated.

THE FRONT CAB MOUNT SUBASSEMBLY 14

The front cab mount subassembly includes a chamber and valve housing 18 mounted on the chassis 10, a plunger 20 mounted on the cab 12, and a shock absorber 22 (shown in detail in FIG. 3) which, for the most part, is contained within the plunger 20. The shock absorber 22 includes a piston 24 slidably received in a sleeve 26. A rod 28 is threadedly received in the piston 24 and extends through a piston 30 threaded to the end of the plunger 20. The rod 28 also extends through the chamber and valve housing 18 and is supported on a shoulder 32 in the chamber and valve housing 18. The lower end of the rod 28 is threaded, and a nut 34 is mounted on the threaded end to hold the rod 28 in position during assembly. Packing 36 is provided between the rod 28 and the chamber and valve housing 18 to prevent leakage of hydraulic fluid between the rod 28 and the housing 18. However, no packing needs to be provided between the rod 28 and the piston 30, since there is hydraulic fluid on both sides of the piston 30.

The piston 24 contains a small stepped bore 38 containing a ball valve 40. The ball valve 40 is held in the larger diameter portion 42 of the stepped bore 38 by a ring 44 mounted in a peripheral groove 46 in the rod 28, and the ball valve 40 seats in a valve seat 48 formed by the juncture of the large diameter portion 42 and the small diameter portion 50 of the stepped bore 38.

The sleeve 26 abuts at one end against a shoulder 52 on the piston 30 and at the other end against a shoulder 54 on a valved plug 56. As shown in FIG. 6, the valved plug 56 is seated in the plunger 20. Accordingly, when the piston 30 is screwed into the plunger 20, the sleeve 26 and the valved plug 56 are held against axial movement.

The valved plug 56 contains a central recess 58 opening into the chamber 60 between the valved plug 56 and the piston 24. A plurality of radially offset, axially spaced through bores 62 extend through the valved plug 56 from the bottom of the recess 58 to a slot 64 forming a hydraulic passage in the valved plug 56. A bolt 66 having a head 68 is threaded centrally into the valved plug 56 at the bottom of the recess 58. A flapper valve 70 which is of sufficient radial extent to block the through bores 62 is slidably mounted on the shank 72 of the bolt 66 and biased towards the bottom of the recess 58 by a compression spring 74. Thus, when there is no flow or an upward flow, the flapper valve 70 cuts off commuciation between the chamber 60 and the slot 64.

A plurality of radial conduits 76 are provided through the sleeve 26 at the bottom of the chamber 78 between the piston 24 and the piston 30. The radial conduits 76 lead to an annular space 80 which extends between the sleeve 26 and the plunger 20 and between the valved plug 56 and the plunger 20, ultimately opening into the slot 64.

When the truck in which the suspension system is installed is in the over-the-road condition (shown in FIG. 1), the piston 24 is normally located approximately equi-distantly between the piston 30 and the plug 56. In its rest position, the chambers 60 and 78 are both filled with hydraulic fluid, the spring 74 biases the flapper valve 70 to its closed position, and the ball valve 40 is open.

If an unevenness in the road forces the piston 24 upwardly in the sleeve 26, flapper valve 70 remains closed, and the ball valve 40 remains open. (Although the ball valve 40 is held against the ring 44, fluid flow around the ball valve 40 and between the ring 44 and the piston 24 remains possible.) Since more of the rod 28 enters the chamber 78 as the piston 24 moves upwardly in the sleeve 26, the volume of the chamber 60 decreases by more than the volume of the chamber 78 increases. Accordingly, more hydraulic fluid is forced out of the chamber 60 and through the stepped bore 38 than can be accommodated in the chamber 78. The excess hydraulic fluid is forced through an annular clearance 81 between the rod 28 and the piston 30 to the chamber 154 as seen in FIG. 3.

When the piston 24 moves back downwardly in the sleeve 26, the ball valve 40 closes. The spring 74 is selected so that downward movement of the piston 24 will cause the flapper valve 70 to open immediately. With the ball valve 40 closed, downward movement of the piston 24 causes a large amount of hydraulic fluid to exit the chamber 78 through the radial conduits 76 and the annular space 81 to annular space 80. Fluid enters chamber 60 through bore 62 and slot 64 from annular space 80. All makeup fluid enters annular space 80 through passageway 310 from chamber 154. The hydraulic fluid from the slot 64 flows through the through bores 62 and the recess 58 into the chamber 60, keeping the chamber 60 filled with hydraulic fluid. Since a portion of the rod 28 exits the chamber 78 as the piston 24 moves downwardly in the sleeve 26, the volume of the chamber 60 increases by more than the volume of the chamber 78 decreases, requiring make-up fluid. The make-up fluid enters the annular space 80 from the chamber 154 through a passageway 310 in the piston 30. From the annular space 80 it flows through the slot 64, the bores 63, and the central recess in the chamber 60.

The chamber and valve housing 18 is composed of a valve block 82, a cylinder 84, and a bearing holder 86. The valve block 82 is mounted on the chassis 10 by means not shown, the cylinder 84 is welded to the valve block 82 at 88, and the bearing holder 86 is screwed into the cylinder 84 at 90. A bearing 92 is press fit into the bearing holder 86, and an end cap 94 is threaded into the bearing holder 86 and against the adjacent end of the bearing 92. O-rings 96 are provided between the bearing 92 and the bearing holder 86, a seal 98 is provided between the bearing 92 and the plunger 20, and a wiper 100 is provided between the end cap 94 and the plunger 20.

The valve block 82 has an upwardly open stepped recess 102. The stepped recess 102 has a cylindrical portion 104 and an upwardly flaring conical portion 106. The cylindrical portion 104 is sized to receive the piston 30 in sealing engagement, and a seal 108 is provided in the periphery of the piston 30 to ensure the tightness of the seal. The conical portion 106 serves as a guide for the piston 30 as it enters the cylindrical portion 104.

The valve block 82 has a horizontal stepped through bore 110. Starting from the left in FIGS. 4 and 5, a first portion 112 of the through bore 110 has a valve seat 114 at one end and is terminated by a plug 116 at the other end. The first portion 112 contains a ball valve 118 which is biased against the valve seat 114 by a compression spring 120. A second portion 122 of the through bore 110 opens into the valve seat 114 and serves as a fluid passageway. The second portion 122 opens into a third portion 124, the periphery of which receives a spool 126 in sealing engagement. The spool 126 carries a pin 128 which extends through (but does not block) the second portion 122 and which can be used to unseat the ball valve 118. The third portion 124 opens into a fourth portion 130, the periphery of which receives spool 132 in sealing engagement. The spool 126 is mounted coaxially on the spool 132. A compression spring 134 bears at one end against the spool 132 and at the other end against a shoulder 136 between the third portion 124 and the fourth portion 130, thus biasing the pin 128 away from the ball valve 118. Finally, a fitting 138 for an air conduit 140 caps the right end of the throughbore 110.

The conduit 140 contains a valve 142 which is under the control of the operator of the vehicle. The conduit 140 is connected to a source of compressed air (not shown) which is not the pressure intensifier subassembly 16.

Figure 2:
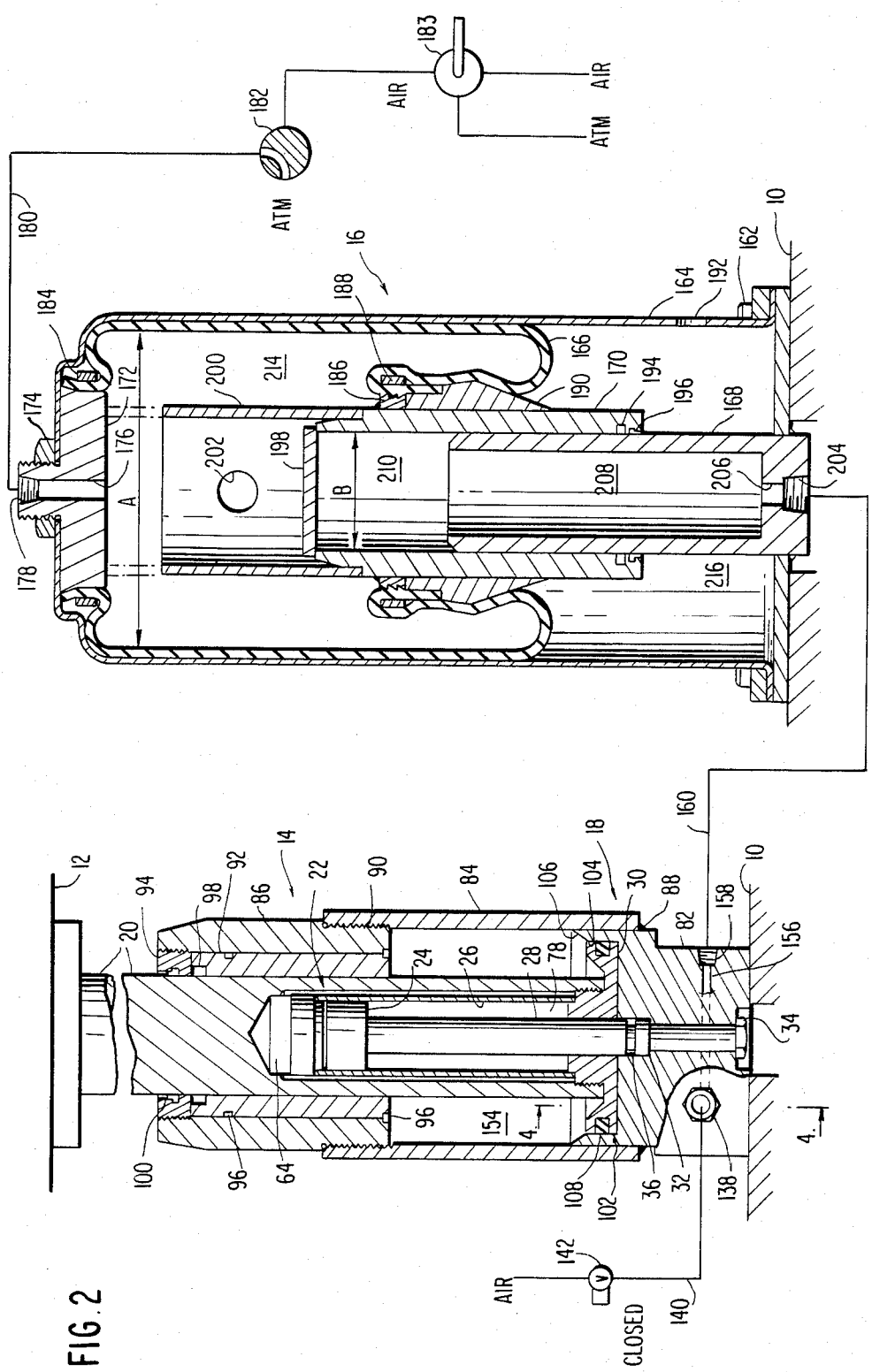
FIG. 2 is a corresponding partially schematic cross-sectional view of the same two subassemblies in their locked down positions.

A first vertical bore 144 leads from the third portion 124 of the horizontal through bore 110 to the bottom of the cylindrical portion 104 of the stepped recess 102. A second vertical bore 146 leads from the first portion 112 of the through bore 110 to the bottom of the cylindrical portion 102. However, the second vertical bore 146 is stopped at the top by plug 148. A first horizontal bore 150 communicates with the vertical bore 146 at one end and with a vertical groove 152 in the surface of the valve block 82 at the other end. The vertical groove 152 extends between the valve block 82 and the cylinder 84, terminating in the conical portion 106 of the stepped recess 102 and providing communication between the first portion 112 of the horizontal through bore 110 and the chamber 154 defined by the valve block 82, the cylinder 84, the bearing holder 86, the bearing 92, the plunger 20, and the piston 30. A second horizontal bore 156 provides communication between the second vertical bore 146 and a fitting 158 for a hydraulic conduit 160. The conduit 160 is connected to the pressure intensifier subassembly 16, as shown in FIGS. 1 and 2.

THE PRESSURE INTENSIFIER SUBASSEMBLY 16

The pressure intensifier subassembly 16 is mounted on the chassis 10 by bolts 162. It consists of an external housing 164, an expandable airspring 166, and telescoping cylinders 168, 170. An end cap 172 protrudes through an opening in the top of the housing 164 and is clamped against the housing by a nut 174. An air passageway 176 extends through the end cap 172, terminating in a fitting 178 for an air conduit 180. The conduit 180 contains a valve 182 which is under the control of the operator of the vehicle and it is connected to a source of compressed air (not shown) through a leveling valve 183 which controls the mean ride height.

The airspring 166 is clamped to the end cap 172 by a round clamp 184. The airspring 166 is clamped at its other end between a grooved ring 186 which is welded to the cylinder 170 and a round clamp 188. The airspring 166 conforms to the inner dimensions of the housing 164 and the outer dimensions of a conical sleeve 190 which is mounted on the cylinder 170 beneath the grooved ring 186. The airspring 166 is shown in its uninflated condition in FIG. 2 and in its inflated condition in FIG. 3. To permit unimpeded expansion and contraction of the airspring 166, an exhaust port 192 is provided in the housing 164.

The cylinders 168 and 170 move longitudinally relative to each other prior to cab tilting. Accordingly, seals 194 and 196 are provided in the inner periphery of the cylinder 170. An end cap 198 is mounted on the outer cylinder 170, and a protective sleeve 200 having an exhaust port 202 is mounted coaxially on the outer cylinder so as to extend above the end cap 198. The protective sleeve 200 prevents the end cap 198 on the outer sleeve 178 from coming into contact with the end cap 172 on the housing 164. The protective sleeve 200 is also used to position the outer cylinder 170 properly for charging the system with hydraulic fluid. Although the protective sleeve 200 can come into contact with the end cap 172, the exhaust port 202 permits air to move through the protective sleeve 200 even when it is in contact with the end cap 172.

The bottom of the inner cylinder 168 is provided with a fitting 204 for connecting the hydraulic conduit 160 to a hydraulic passageway 206 through the bottom of the inner cylinder 168. Accordingly, the interior 208 of the inner cylinder 168 and the interior 210 of the outer cylinder 170 are filled with hydraulic fluid from the hydraulic conduit 160, while the interior of the protective sleeve 200 and the interior 214 of the airbag 166 are filled with air from the air conduit 180. The interior 216 of the housing 164 beneath the airspring 166 is filled with air at atmospheric pressure from the exhaust port 192. Thus, at equilibrium the downward force exerted by the airspring 166 across its effective area "A" equals the upward force exerted by the hydraulic pressure across the inner diameter "B" of the outer cylinder 170. Since the effective area "A" is considerably greater than the effective area "B", the induced pressure of the hydraulic fluid in the interior 210 of the outer cylinder 170 is correspondingly greater than the supplied pressure of the air in the interior 214 of the airspring 166. In a practical embodiment of the invention, the ratio of the former pressure to the latter pressure is five to one.

OPERATION OF THE INVENTION

When the tilt cab truck is in its normal, over-the-road condition, the components are in the relationship shown in FIG. 1. That is, the valve 182 is open, and pressurized air is supplied to the interior 214 of the airspring 166 via the air conduit 180 and the air passageway 176. As previously explained, the air pressure in the interior 214 of the airspring 166 induces a higher pressure in the hydraulic fluid in the interior 210 of the outer cylinder 170. That hydraulic pressure is communicated through the interior 208 of the inner cylinder 168 and the hydraulic passageway 206 to the hydraulic conduit 160, which communicates the pressure to the horizontal bore 156 in the valve block 82.

In the valve block 82, the hydraulic fluid under pressure in the horizontal bore 156 communicates with the vertical bore 146. The pressure in turn is communicated upward to the chamber 154. (Note that the valve 142 is open during the over-the-road condition, so the pin 128 is in the position shown in FIG. 5.) The pressure in the vertical bore 146 is also communicated to the horizontal bore 150, the vertical groove 152, and the chamber 154. In the chamber 154, the hydraulic pressure acts upwardly on the working diameter "C" of the piston 30 to balance the downward force on the plunger 20, which of course is mounted on the cab 12. When plunger 20 moves downwardly in the chamber 154, an internal damping takes place around the piston 24, as previously explained. However, it will now be obvious that an external damping also takes place, since movement of the plunger 20 in or out of the chamber 154 causes a relatively large amount of hydraulic fluid to be forced in or out of the chamber 154 and back down through the fitting 158, the second horizontal bore 156, the hydraulic conduit 160, the hydraulic passageway 206, the interior 208 of the inner sleeve 168, and the interior 210 of the outer sleeve, where it induces an incremental additional pressure in the air in the interior 214 of the airspring 166. The latter causes a slight increase or decrease in the length of the airspring 160.

When it is desired to tilt the cab 12 to its maintenance position, the valve 182 is turned to the position shown in FIG. 2, allowing the pressure in the interior 214 of the air bag 166 to exhaust to atmosphere through the air passageway 176 and the air conduit 180. When the air pressure in the interior 214 of the airspring 166 reduces to atmospheric pressure, it ceases to induce a high hydraulic pressure in the interior 210 of the outer cylinder 170, and consequently in the interior 208 of the inner cylinder 168, the hydraulic passageway 206, the hydraulic conduit 160, the horizontal bore 156, the fitting 158, the horizontal bore 150, the vertical groove 152, and the chamber 154. As the pressure drops in the chamber 154, the weight of the cab 12 forces the plunger 20 and the piston 30 downwardly in the chamber 154. This causes hydraulic fluid to move from the chamber 154 to the interiors 208 and 210 of the inner and outer cylinders 168 and 170, respectively. However, since the air pressure above the end cap 198 is atmospheric, this only causes the outer cylinder 170 to move upwardly relative to the inner cylinder 168, thereby increasing the size of the reservoir for hydraulic fluid.

As the piston 30 moves downwardly in the chamber 154, it enters the upwardly open stepped recess 102 in the valve block 82. Once it enters the cylindrical portion 104 of the recess 102, it induces a pressure in the vertical bore 144 which is communicated to the third portion 124 and the second portion 122 of the through bore 110. (See FIG. 4.) The pressure in the second portion 122 unseats the ball valve 118, permitting the hydraulic fluid from the cylindrical portion 104 of the recess 102 to exit to the reservoir 208, 210 through the ventrical bore 144, the third and second portions 124, 122 of the through bore 110, the vertical bore 146, and the horizontal bore 156. Accordingly, the piston 30 settles down to the bottom of the cylindrical portion 104 of the recess 102.

Once the piston 30 has reached the bottom of the cylindrical portion 104 of the recess 102, the induced pressure in the vertical bore 144 changes to a value low enough so that the compression spring 120 closes the ball valve 118. At that point, a hydraulic lock is formed in the through bore 110, the horizontal bore 150, the vertical groove 152, and the chamber 154. Thus, the piston 30 and the plunger 20 cannot be raised during tilting of the cab 12, and the piston 30 remains firmly in contact with the bottom of the cylindrical portion 104 of the recess 102 during tilting of the cab 12.

After the cab 12 has been tilted back down to its over-the-road position, the valve 142 is opened and the valve 182 is turned to the position shown in FIG. 1. When the valve 142 is opened, air under pressure enters the fitting 138 through the air conduit 140. (See FIG. 5.) That air pushes the spool 132 to the left in FIG. 5 against the face of the compression spring 134. Leftwards motion of the spool 132 in turn causes leftwards motion of the pin 128, unseating the ball valve 118 and breaking the hydraulic lock formed when the ball valve 118 seated in the valve seat 114. At the same time, when the valve 182 is turned to the position shown in FIG. 1, air under pressure enters the interior 212 of the protective sleeve 200 via the air conduit 180, the air passageway 176, and the interior 214 of the airspring 166. The pressurized air in the interior 214 of the airspring 166 induces a higher pressure in the interior of the outer sleeve 170. That higher pressure is transmitted to the cylindrical portion 104 of the recess 102 via the interior 208 of the outer cylinder 168, the hydraulic passageway 206, the hydraulic conduit 160, the horizontal bore 156, the fitting 158, the first, second, and third portions 112, 122, and 124 of the through bore 110, and the vertical bore 144. At the same time, the same hydraulic pressure is communicated to the chamber 154 via the vertical bore 146, the horizontal bore 150, and the vertical groove 152. However, the pressure on the upper face of the piston 30 is balanced by an equal and opposite pressure on the outer portion of the lower face of the piston 30, and the unbalanced pressure on the working diameter "C" of the piston 30 causes the piston 30 to unseat itself from the stepped recess 102 and to return to the equilibrium position shown in FIG. 1.

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

We claim:

1. A suspension system for a tilt cab truck, said suspension system comprising:
   (a) a plunger ending in a first piston;
   (b) a cylinder which contains a first chamber having a first end and a second end, said plunger being slidably and sealingly received in the first end of said cylinder and said first piston being received in said first chamber, said first chamber having at least two portions having different cross-sections, a first portion adjacent the first end of said cylinder which receives said first piston in a fashion which permits passage of a working fluid around said first piston and a second portion adjacent the second end of said cylinder which slidably and sealingly receives said first piston;
   (c) first fluid conduit means for conducting working fluid to and from said first portion of said first chamber;
   (d) second fluid conduit means for conducting working fluid to and from said second portion of said first chamber comprising a first means of fluid communication leading from said second portion of said chamber to a reservoir for working fluid; and
   (e) third fluid conduit means for blocking said second fluid conduit means, forming a hydraulic lock, when said first piston has seated itself against the end of said second portion of said first chamber comprising a normally open valve in said first means of fluid communication, said valve being opened by fluid pressure when said first piston enters said second portion of said first chamber, being closed when said first piston is seated against the end of said second portion of said first chamber, and being selectively openable when it is desired to break the hydraulic lock formed when said first piston has seated itself against the end of said second portion of said first chamber.

2. A suspension system as recited in claim 1 wherein said first and second fluid conduit means connect between said valve and said reservoir.

3. A suspension system as recited in claim 1 wherein said reservoir comprises a pressure intensifier which acts both as a reservoir for working fluid and a selectively operable source of working fluid under pressure.

4. A suspension system as recited in claim 1 wherein said plunger contains a shock absorber.

5. A suspension system as recited in claim 1 wherein said shock absorber comprises:
   (a) a rod mounted in the second end of said cylinder and ending in a second piston;
   (b) a second chamber contained in said plunger, said second piston being slidably received in said second chamber; and
   (c) third fluid conduit means which permit restricted passage of damping fluid back and forth between opposite sides of said second piston in said second chamber.

* * * * *